(12) United States Patent
Vaittinen et al.

(10) Patent No.: US 7,933,626 B2
(45) Date of Patent: Apr. 26, 2011

(54) POWER CONTROL

(75) Inventors: Rami Vaittinen, Littoinen (FI); Harri Jokinen, Pertteli (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/322,025

(22) Filed: Jan. 27, 2009

(65) Prior Publication Data

US 2009/0143092 A1 Jun. 4, 2009

Related U.S. Application Data

(63) Continuation of application No. 11/214,071, filed on Aug. 29, 2005, now abandoned.

(30) Foreign Application Priority Data

Nov. 9, 2004 (GB) ................................. 0424735.9

(51) Int. Cl.
 *H04B 7/00* (2006.01)
(52) U.S. Cl. .......................................... 455/522; 455/69
(58) Field of Classification Search .................. 455/522, 455/69; 370/335, 342
 See application file for complete search history.

(56) References Cited

U.S. PATENT DOCUMENTS

| | | | | |
|---|---|---|---|---|
| 2004/0032841 | A1* | 2/2004 | Jeschke et al. | 370/335 |
| 2004/0110525 | A1 | 6/2004 | Black et al. | 455/522 |

FOREIGN PATENT DOCUMENTS

| | | | |
|---|---|---|---|
| EP | 1081877 A1 | | 3/2001 |
| EP | 1081877 A1 | * | 3/2001 |
| EP | 1367739 A1 | | 12/2003 |
| EP | 1389836 A1 | | 2/2004 |

OTHER PUBLICATIONS

3GPP TS 23.060 V6.5.0 (Jun. 2004), "Technical Specification Group Services and System Aspects; General Packet Radio Service (GPRS)"; Service description; Stage 2 (Release 6), pp. 1-211.
3GPP TS 45.005 V6.6.0 (Jun. 2004), "Technical Specification Group GSM/EDGE Radio Access Network"; Radio transmission and reception (Release 6), pp. 1-122.
3GPP TS 45.008 V6.8.0 (Jun. 2004), "Technical Specification Group GSM/EDGE Radio Access Network"; Radio subsystem link control (Release 6), pp. 1-109.
3GPP TS 44.060 V6.8.0 (Jul. 2004), "Technical Specification Group GSM/EDGE Radio Access Network; General Packet Radio Service (GPRS); Mobile Station (MS)—Base Station System (BSS) interface"; Radio Link Control/Medium Access Control (RLC/MAC) protocol (Release 6), pp. 1-355.
3GPP TS 44.018 V6.8.0 (Jul. 2004), "Technical Specification Group GSM/EDGE Radio Access Network; Mobile radio interface layer 3 specification"; Radio Resource Control (RRC) protocol (Release 6), pp. 1-325.

* cited by examiner

*Primary Examiner* — Edward Urban
*Assistant Examiner* — Golam Sorowar
(74) *Attorney, Agent, or Firm* — Harrington & Smith

(57) ABSTRACT

The invention relates to control of transmission power in cellular networks, specifically in cells having transmitters in several frequency bands. The invention allows the network to control the maximum transmission power of a mobile station in more than one frequency band.

13 Claims, 4 Drawing Sheets

GSM 400, GSM 900, GSM 850 and GSM 700

| Power control level | Nominal Output power (dBm) | Tolerance (dB) for conditions | |
|---|---|---|---|
| | | Normal | extreme |
| 0-2 | 39 | ±2 | ±2,5 |
| 3 | 37 | ±3 | ±4 |
| 4 | 35 | ±3 | ±4 |
| 5 | 33 | ±3 | ±4 |
| 6 | 31 | ±3 | ±4 |
| 7 | 29 | ±3 | ±4 |
| 8 | 27 | ±3 | ±4 |
| 9 | 25 | ±3 | ±4 |
| 10 | 23 | ±3 | ±4 |
| 11 | 21 | ±3 | ±4 |
| 12 | 19 | ±3 | ±4 |
| 13 | 17 | ±3 | ±4 |
| 14 | 15 | ±3 | ±4 |
| 15 | 13 | ±3 | ±4 |
| 16 | 11 | ±5 | ±6 |
| 17 | 9 | ±5 | ±6 |
| 18 | 7 | ±5 | ±6 |
| 19-31 | 5 | ±5 | ±6 |

Table 1

Fig. 1

DCS 1800

| Power control level | Nominal Output power (dBm) | Tolerance (dB) for conditions | |
|---|---|---|---|
| | | Normal | extreme |
| 29 | 36 | ±2 | ±2,5 |
| 30 | 34 | ±3 | ±4 |
| 31 | 32 | ±3 | ±4 |
| 0 | 30 | ±3 | ±4 |
| 1 | 28 | ±3 | ±4 |
| 2 | 26 | ±3 | ±4 |
| 3 | 24 | ±3 | ±4 |
| 4 | 22 | ±3 | ±4 |
| 5 | 20 | ±3 | ±4 |
| 6 | 18 | ±3 | ±4 |
| 7 | 16 | ±3 | ±4 |
| 8 | 14 | ±3 | ±4 |
| 9 | 12 | ±4 | ±5 |
| 10 | 10 | ±4 | ±5 |
| 11 | 8 | ±4 | ±5 |
| 12 | 6 | ±4 | ±5 |
| 13 | 4 | ±4 | ±5 |
| 14 | 2 | ±5 | ±6 |
| 15-28 | 0 | ±5 | ±6 |

Table 2

Fig. 2

POWER CONTROL

CROSS REFERENCE TO RELATED APPLICATION

This is a continuation patent application of application Ser. No. 11/214,071 filed Aug. 29, 2005 now abandoned, the contents of which are hereby incorporated by reference.

FIELD OF INVENTION

The invention relates to control of transmission power in communications networks, specifically in systems wherein transmitters operate in several frequency bands.

TECHNOLOGICAL BACKGROUND

A communications network is a facility which enables communication between two or more entities such as user terminal equipment (mobile or fixed) or other communication device, network entities and other nodes. The communication may comprise, for example, communication of voice, electronic mail (email), text messages, data, multimedia and so on.

A communications network typically operates in accordance with a given rules which set out what the various elements of a system are permitted to do and how that should be achieved. For example, a standard or specification may define if the user, or more precisely user equipment, is provided with a circuit switched (CS) bearer or a packet switched (PS) bearer, or both. Communication protocols and/or parameters which should be used for the connection are also typically defined. For example, the manner in which communication should be implemented between the user equipment and the elements of the communication networks is typically based on a predefined communication protocol.

Access to the communication network may be provided by a fixed line or wireless communication interface. Communication systems providing wireless access enable at least some degree of mobility for the users thereof. More advanced mobility support can typically be added as an enhanced feature. An example of communication networks providing wireless access is a public land mobile network (PLMN). The public land mobile networks (PLMN) are commonly based on cellular technology. In cellular systems, a base transceiver station (BTS) or similar access entity services mobile communication device or user equipment (UE) via a wireless interface between these entities. These devices will in the following be referred commonly as mobile stations. The communication on the wireless interface between the mobile station and elements of the communication network can be based on an appropriate communication protocol. The operation of the base station apparatus and other apparatus required for the communication can be controlled by one or several control entities. Non-limiting examples of PLMN systems include the GSM (Global System for Mobile communications), the so called 2.5 generation GPRS (General Packet Radio Service) or the third generation (3G) networks such as WCDMA (Wideband Code Division Multiple Access) or EDGE (Enhanced Data for GSM Evolution). Other examples of wireless access technologies include various wireless local area networks (WLANs) and satellite based systems.

The various control entities of a communication system may be interconnected. One or more gateway nodes may be provided for connecting a network to other communication networks, for example to an IP (Internet Protocol) and/or other packet switched data networks. In such arrangements, the communications network provides user with access to external networks, hosts, or services offered by specific service providers.

An example of the drawbacks of the current system will now be described with reference to the GSM (Global System for Mobile communication). The first GSM networks were designed for voice services. When the use of the GSM data services started, it became evident that the circuit switched bearer services were not particularly well suited for certain types of applications with a bursty nature. Therefore the new packet switched (PS) data transmission service GPRS (General Packet Radio Service) was also defined for packet services. GPRS is a packet radio network utilising the GSM network, which endeavours to optimise data packet transmission by means of GPRS protocol layers on the air interface between a mobile station and a GPRS network.

According to third generation partnership project (3GPP) standards, a GPRS mobile station (MS) can operate in one of three modes of operation as disclosed for example by the standard document 3GPP TS 23.060 version 6.5.0 of June 2004. These modes are:

1. Class A mode of operation: the MS is attached to the both GPRS and other GSM services. The mobile user can make and/or receive calls on the two services simultaneously e.g. having a normal GSM voice call and receiving GPRS data packets at the same time.
2. Class B mode of operation: the MS is attached to the both GPRS and other GSM services, but the MS can only operate on set of services at a time.
3. Class C mode of operation: the MS can only be attached either to the GSM network or the GPRS network. The selection is done manually and there are no simultaneous operations.

Multiple frequency bands have been specified for example in the standard 3GPP TS 45.005 version 6.6.0 of July 2004 for GSM operation. A multi-band GSM network may use frequencies from multiple, typically two, different frequency bands. A single cell of a GSM system may use frequencies from a single frequency band only or it may use frequencies from multiple frequency bands. The latter is often called "common BCCH cell" as the frequency identifying the cell and broadcasting BCCH (broadcast control channel) information is common for traffic channels on that cell, where the traffic channels may be assigned on different frequency bands.

According to the 3GPP standards, a mobile station (MS) transmitting packet data to the network uses the output power given by the formula in the sub-clause 10.2.1 of the standard specification 3GPP TS 45.008 version 6.0.8 of July 2004. According to that sub-clause the radio frequency (RF) output power, $P_{CH}$, to be employed by the mobile station on each individual uplink Packet Data Channel (PDCH) shall be:

$$P_{CH} = \min(\Gamma_0 - \Gamma_{CH} - \alpha*(C+48), PMAX),$$

where $\Gamma_{CH}$ is an MS and channel specific power control parameter, sent to the MS in an radio link control (RLC) control message (see 3GPP TS 44.060).

$\Gamma_0 = 39$ dBm for GSM 400, GSM 700, GSM 850 and GSM900=36 dBm for DCS1800 and PCS 1900

$\alpha$ is a system parameter, broadcast on PBCCH or optionally sent to MS in an RLC control message (see 3GPP TS 44.018 and 3GPP TS 44.060).

C is the normalised received signal level at the MS as defined in sub-clause 10.2.3.1 of the above referred standard specification 3GPP TS 45.008.

PMAX is the maximum allowed output power in the cell, which is
GPRS_MS_TXPWR_MAX_CCH if present,
MS_TXPWR_MAX_CCH otherwise.

As can be seen the key factor is the PMAX, since nevertheless what the calculation gives the mobile station shall use the lowest of the two; $(\Gamma_0 - \Gamma_{CH} - \alpha*(C+48))$ or PMAX given as the network delivered parameter. PMAX parameter is broadcast on a broadcast control channel (BCCH) in system information 13 (SI3) and in system information 14 (SI4) and respectively on packet broadcast control channel (PBCCH) in packet system information 13 (PSI3), see, for example, 3GPP TS 44.018 version 6.8.0 of July 2004 and 3GPP TS 44.060 version 6.8.0 of July 2004. The formula and the comparison work well when the packet resources are allocated in the same band than BCCH and/or PBCCH.

The exemplifying Table 1 of FIG. 1 presents the nominal output powers of GSM 400, GSM 900, GSM 850 and GSM 700 bands according to GSM standards. If the MS is packet idle mode listening BCCH (in 900 MHz band) intermittently and it receives the MS_TXPWR_MAX_CCH parameter with value 8 then the nominal output power level is 27 dBm. Then the MS requests packet resources and the network allocates resources on 1800 MHz. As can be seen from the second table in the following, value 8 denotes 14 dBm on the 1800 MHz band instead of 27 dBm on 900 MHz band. Too low output power level may lead to a poor signal quality and respectively too high power level may cause unnecessary interference.

Table 2 of FIG. 2 presents nominal output powers for DCS 1800 band as specified in 3GPP TS 45.005 version 6.6.0 of July 2004.

These arrangements have certain problems. The mobile station's maximum output power is based on parameters received in system information messages on (P)BCCH channel while in the packet idle mode. When the network allocates packet resources on a different frequency band than the common (P)BCCH channels the network may have difficulties in setting the correct maximum output power for the mobile station. The network cannot optimise the maximum power for each frequency band separately in a common BCCH cell and especially, because of the different mapping of power control levels on different frequency bands, the network cannot set the same dBm value, or a value that reflects the frequency band specific path loss for each frequency band on that cell, for the maximum output power on each frequency band.

SUMMARY OF THE INVENTION

Embodiments of the present invention aim to overcome one or several of the above problems.

According to one aspect of the invention there is provided a method for controlling transmission power of a mobile station communicating with a telecommunications network. The method comprises determining a maximum output power level of a mobile station in a first frequency band, transmitting a first parameter value indicative of said maximum output power level of a mobile station in a first frequency band, determining a maximum output power level of the mobile station in at least one second frequency band, and transmitting at least one second parameter value indicative of the maximum output power level in association with said at least one second frequency band.

According to another aspect of the invention, there is provided a method for determining maximum transmission power. The method comprises receiving in mobile station a first transmission power parameter value, determining an output power level of the mobile station in a first frequency band based on said first transmission power parameter value, receiving at least one second transmission power parameter value, and determining a maximum output power level of the mobile station in at least one second frequency band based on said first transmission power parameter value and at least one second transmission power parameter value.

According to a yet another aspect of the invention, there is provided a method for determining maximum transmission power. The method comprises receiving a first parameter value, determining a maximum output power level of a mobile station in a first frequency band based on said first parameter value, receiving a second parameter value, and determining a maximum output power level of the mobile station in a second frequency band based on said second parameter value and a predetermined offset value.

According to a yet another aspect of the invention, a method for determining maximum transmission power in a mobile station is provided. The method comprises receiving a power control parameter value, determining a maximum output power level of the mobile station in a first frequency band based on said parameter value and a first predetermined offset value, and determining a maximum output power level of the mobile station in a second frequency band based on said parameter value and a second predetermined offset value.

According to a still another aspect of the invention, a method for determining maximum transmission power in a mobile station is provided. The method comprises receiving a power control parameter value, receiving a flag indicative how an output power is to be derived from the received power control parameter, detecting that the flag indicates multi-band operation, and determining a maximum output power level of the mobile station in a frequency band by mapping for a power control parameter value and a predetermined frequency band specific offset value.

There is also provided a node for a telecommunications network configured to determine a maximum output power level of a mobile station in a first frequency band, to transmit a first parameter value indicating said maximum output power level of the mobile station, to determine a maximum output power level of the mobile station in at least one second frequency band, and to transmit at least one second parameter value indicative the maximum output power level in association with said at least one second frequency band.

According to an aspect, there is provided a mobile station configured to receive a first maximum transmission power parameter value, to determine a maximum output power level of the mobile station in a first frequency band based on said first parameter value, to receive a second transmission power parameter value, and to determine a maximum output power level of the mobile station in at least one second frequency band based on said first transmission power parameter value and at least one second transmission power parameter value.

According to another aspect, a mobile station is configured to receive a first parameter value, to determine a maximum output power level of the mobile station in a first frequency band based on said first parameter value, to receive a second parameter value, and to determine a maximum output power level of the mobile station in a second frequency band based on said second parameter value and a predetermined offset value.

In accordance with a yet another aspect a mobile station is configured to receive a power control parameter value, to determine a maximum output power level of the mobile station in a first frequency band based on said power control parameter value and a first predetermined offset value, and to determine a maximum output power level of the mobile station in a second frequency band based on said power control parameter value and a second predetermined offset value.

BRIEF DESCRIPTION OF THE DRAWINGS

Embodiments of the present invention will now be described by way of example with reference to the accompanying drawings, in which:

FIGS. 1 and 2 show nominal output power Tables for exemplifying telecommunications systems.

DETAILED DESCRIPTION OF EMBODIMENTS

Figure 3:
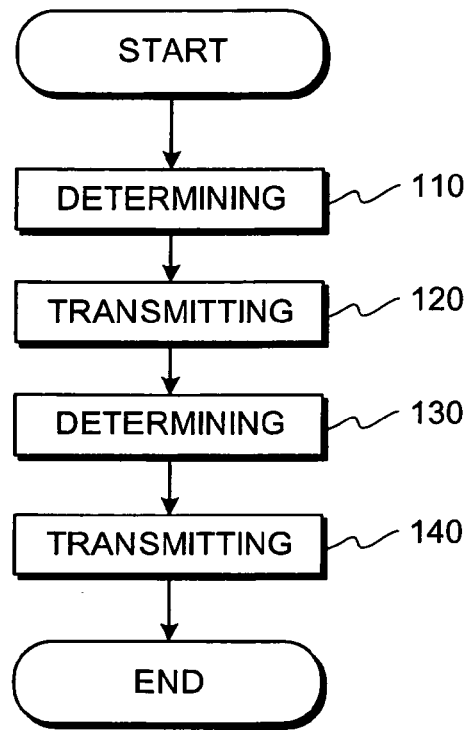
FIG. 3 illustrates a method according to an advantageous embodiment of the invention.

FIG. 3 illustrates a method in accordance with an embodiment for a network node of a telecommunications network for controlling transmission power of mobile stations communicating with the telecommunications network. A maximum output power level of a mobile station is first determined at 110 in a first frequency band, where after a first parameter value indicating said maximum output power level of a mobile station is transmitted at 120 in a first frequency band. A maximum output power level of a mobile station in a second frequency band is also determined at 130, where after a second parameter value indicating an offset from said maximum output power level of a mobile station is transmitted in the first frequency band.

Figure 4:
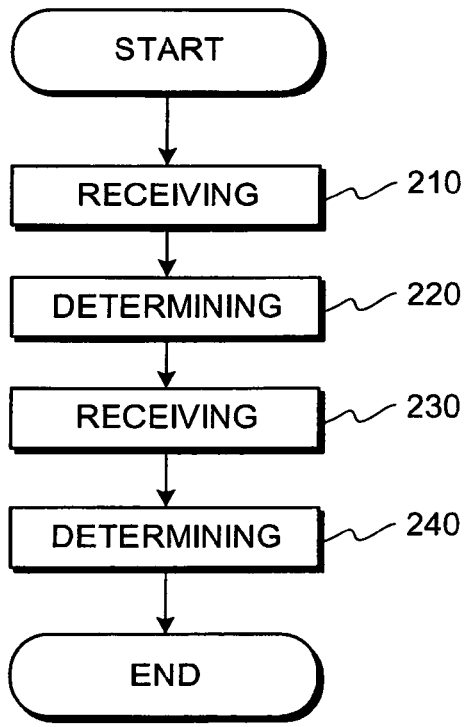
FIG. 4 illustrates a method according to a further advantageous embodiment of the invention.

FIG. 4 illustrates a method in accordance with another embodiment for determining maximum transmission power in a mobile station of a telecommunications network. In the embodiment a first maximum transmission power parameter value is received at 210, where after a maximum output power level of the mobile station in a first frequency band is determined at 220 based on said first parameter value. A second transmission power parameter value can be received at 230, where after a maximum output power level of the mobile station in a second frequency band can be determined at 240 based on said first and second transmission power parameter values.

Figure 5:
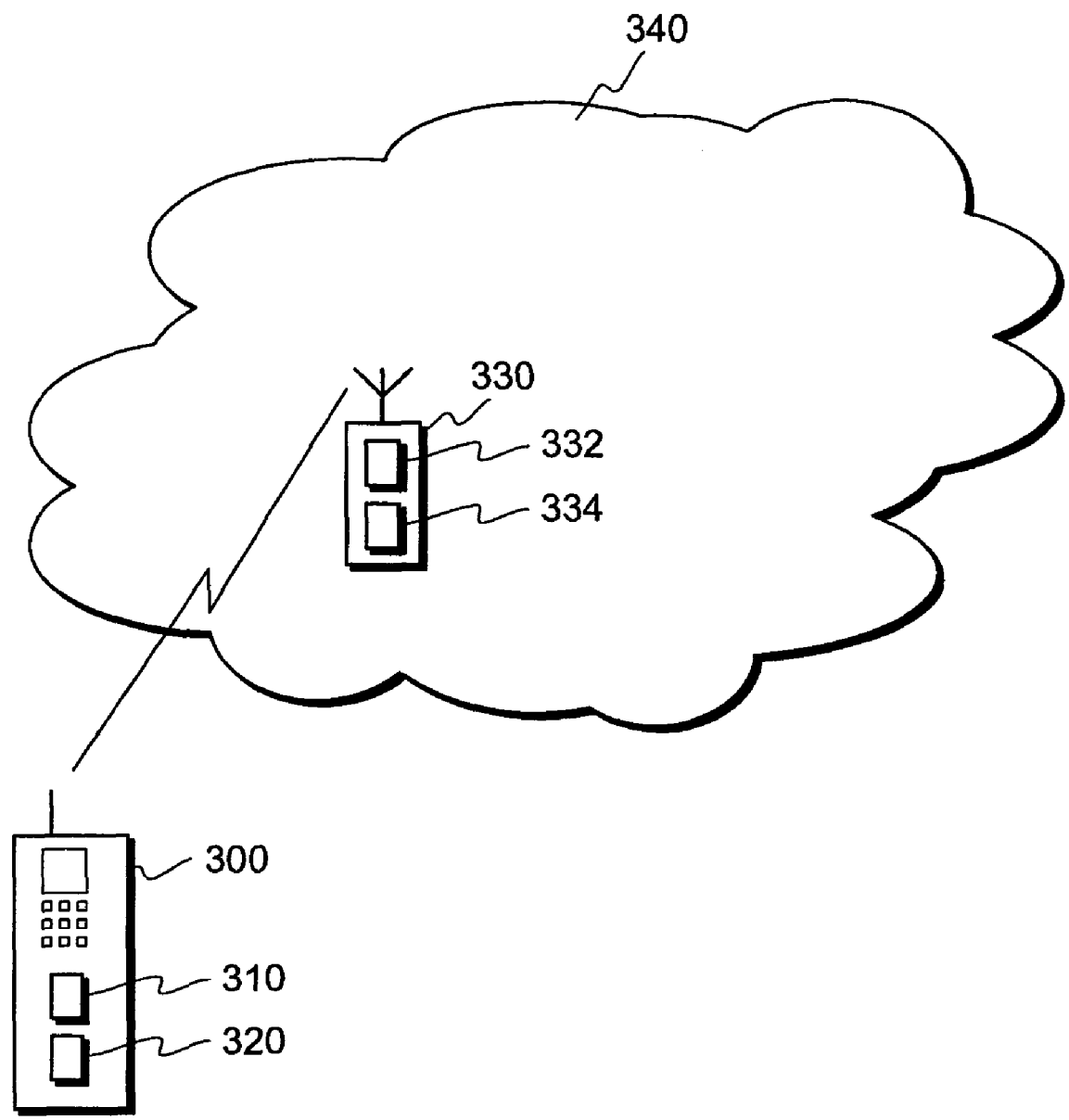
FIG. 5 illustrates various further embodiments of the invention.

FIG. 5 illustrates schematically a telecommunications system wherein the various embodiments may be implemented. FIG. 5 illustrates a mobile station 300, a cellular network 340, and a network element 330 of the cellular network 340. In the example of FIG. 5, the network element 330 is a base station.

A cellular network is typically arranged to serve a plurality of mobile stations, via a wireless interface between the mobile stations and base stations of the communication system. The cellular communication network may provide packet switched data transmission in the packet switched domain between a support node and a mobile station. The network in turn may be connected to external networks, for example the Internet, via an appropriate gateway to allow communication between mobile stations and external networks. In addition to at least one gateway, a network may comprise also other nodes, for example radio network and/or base station controllers.

The base station 330 is arranged to transmit signals to and receive signals from the mobile station 300, via respective wireless interfaces. Correspondingly, each mobile station is able to transmit signals to and receive signals from the base stations via the wireless interface.

A mobile station within an access network may communicate via radio network channels which are typically referred to as radio bearers. Each mobile station such may have one or more radio channels open at any one time. The mobile station can be used for various tasks such as making and receiving phone calls, for receiving and sending data from and to a network and for experiencing, for example, multimedia or other content. The mobile station is typically provided with a processor and memory for accomplishing these tasks. The operation of the mobile station may be controlled by means of a suitable user interface such as key pad, voice commands, touch sensitive screen or pad, combinations thereof or the like. A mobile station also typically comprise components such as an antenna, a transmitter, a power source. Various components of a mobile station known to a man skilled in the art, wherefore they are not described in detail in this application. Non-limiting examples of the mobile stations include a personal computer, a personal data assistant (PDA), a mobile phone, a portable computer, and various combinations thereof.

FIG. 5 illustrates certain details of a mobile station 300 in accordance with an embodiment. The mobile station 300 comprises a receiver 310 for receiving a first maximum transmission power parameter value and a second transmission power parameter value. The mobile station also comprises a controller 320 for determining a maximum output power level of the mobile station in a first frequency band based on said first parameter value, and for determining a maximum output power level of the mobile station in a second frequency band based on said first and second transmission power parameter values. It is noted that these component may be provided separately for the first and second frequency bands, if this is deemed appropriate.

In an embodiment of the invention, the method can be implemented by means of software programs executed by a processor in the mobile station. In such an implementation, the receivers 310 can be implemented using computer software code means which are arranged to receive data and store received parameter values, while said controllers 320 can be implemented using computer software code means which perform said determinations.

FIG. 5 also illustrates some further details of the network element 330, which comprises an implementation of an advantageous embodiment of the invention. As shown in FIG. 5, the network element 330 comprises a controller 332 for determining a maximum output power level of a mobile station in a first frequency band, a transmitter 334 for transmitting a first parameter value indicating said maximum output power level of a mobile station in a first frequency band, a controller 332 determining a maximum output power level of a mobile station in a second frequency band, and a transmitter 334 for transmitting a second parameter value indicating an offset from said maximum output power level of a mobile station in a first frequency band.

In a further advantageous embodiment of the invention, the invention can be implemented using software in the network element. In this embodiment, the controllers 332 can be implemented using computer software code means in the network element. Also the transmitters 334 can be implemented as computer software code means causing the transmission of said values from the processor unit of the network element.

According to an embodiment of the invention, existing parameters MS_TXPWR_MAX_CCH and GPRS_MS_TXPWR_MAX_CCH (if PBCCH is present) may be used to control maximum output power level of upper bands (e.g. DCS 1800 MHz 1900 MHz) and a new parameter may used to control maximum output power level of lower bands (e.g. GSM 400, GSM 900, GSM 850 and GSM 700 bands). This new parameter, here called the TBF_MS_TXPWR_MAX parameter, may be used to represent an offset from the upper band value.

According to a further embodiment of the invention, the TBF_MS_TXPWR_MAX parameter represents an absolute value.

The TBF_TXPWR_MAX parameter may be specified independently band by band.

The TBF_MS_TXPWR_MAX parameter can be transmitted in SI13 rest octets information element (IE) sent on BCCH. In a PBCCH channel, the parameter can be transmitted in a PACKET SYSTEM INFORMATION 1 (PSI1) message.

According to an embodiment, existing parameters, for example MS_TXPWR_MAX_CCH and GPRS_MS_TXPWR_MAX_CCH (if PBCCH is present), may be used as a parameter to control maximum output power level of an upper frequency band (e.g. 1800 MHz), and a first new parameter may be used to control maximum output power level for one of the lower bands (e.g. 900 MHz). Maximum output power levels for other bands may be specified using frequency band specific predetermined fixed offset parameters. These parameters may indicate the maximum transmission power for each band as an offset from said first new parameter. Alternatively, the offset may be from the parameter associated with said upper frequency band, or from another further parameter. There can be a separate individually assigned predetermined offset parameter for each of a plurality of frequency bands.

For example, in a GPRS system the above parameters could be such that a 'MS_TXPWR_MAX_CCH' corresponds to the first parameter, and 'LB_MS_TXPWR_MAX_CCH' corresponds to the second parameter.

For example, this mapping can be achieved by setting code point 1 for MS_TXPWR_MAX_CCH parameter (and respectively for GPRS_MS_TXPWR_MAX_CCH if PBCCH is present) and for a new parameter code point 10 (assuming that existing mapping table specified in 3GPP TS 45.005 is used also for a new parameter). The corresponding mapping of the maximum output power may then be:

| Frequency band | offset |
| --- | --- |
| 1800 MHz | 28 dBm |
| 900 MHz | 23 dBm |
| 450 MHz | 23 dBm − 6 dB = 17 dBm |

Possible predetermined fixed offset values for different lower band frequencies may be set for example as follows (in the example relative to the 900 MHz band):

| Frequency band | offset |
| --- | --- |
| 900 MHz | 0 dB |
| 850 MHz | 0 dB |
| 700 MHz | −2 dB |
| 400 MHz | −6 dB |

Use of individually set offsets for different frequency bands has the advantage that it can enable optimal maximum output power level setting for all lower bands supported in a given cell.

According to a further embodiment, maximum output power on different bands is controlled by predefining a frequency band specific offset for each frequency band in use at a cell, transmitting a power control parameter, and calculating the maximum output power value for transmissions on a specific frequency band from said power control parameter and the predefined offset value corresponding to this specific frequency band.

The frequency band specific offset could be defined for all bands in use at a base station, e.g. as follows using 900 MHz band as a reference band:

| Frequency band | offset |
| --- | --- |
| 1900 MHz | +6 dB |
| 1800 MHz | +6 dB |
| 900 MHz | 0 dB |
| 850 MHz | 0 dB |
| 700 MHz | −2 dB |
| 400 MHz | −6 dB |

This embodiment can advantageously be implemented by arranging a base station transmit a power control parameter according to prior art, and a second power control parameter. In such an implementation, mobile stations which are incapable of performing the inventive method obey the power control parameter transmitted according to prior art, and mobile stations which can perform according to the invention can use the second power control parameter and the predefined offset values for determining maximum transmission power levels in different frequency bands.

According to a still further embodiment of the invention, maximum transmission powers in different frequency bands are controlled by storing predetermined offset values in a mobile station and transmitting an indication from the network to the mobile station that these offset values are to be applied. As a response to reception of said indication, it is possible to determine the maximum transmission power in a frequency band on the basis of a maximum transmission power parameter for a predetermined frequency band (such as, for example, the MS_TXPWR_MAX_CCH or GPRS_MS_TXPWR_MAX_CCH parameter) and the offset value corresponding to the frequency band. The transmission power parameter may be defined as for specific predetermined frequency bands. A frequency band specific offset to this value may then be applied to other bands. This embodiment has advantage in that the indication that the offset values are to be applied can be as simple as a one-bit flag transmitted from the base station to the mobile station. Because of this the implementation of this embodiment adds very little load on the air interface.

The above described embodiments provide several advantages. Accurate control of maximum output power on a common BCCH cell may be allowed. The behaviour of legacy terminals can be maintained as optimal as possible. The link budget properties of different bands can be taken into account without having a specific maximum output power parameter defined for each band separately. The number of bits used for signalling can be kept low.

It is noted that while the preceding description illustrates various embodiments of the invention with reference to cellular telecommunications systems such as the GSM and 3G systems, the invention is not limited to cellular systems, but can be implemented in different types of communication systems as well. The embodiments are applicable to packet switched access and circuit switched access.

It is also noted herein that while the above describes exemplifying embodiments of the invention, there are several variations and modifications which may be made to the disclosed solution without departing from the scope of the present invention as defined in the appended claims.

The invention claimed is:

1. An apparatus comprising: a receiver configured to receive a parameter value; and a determiner configured to determine a maximum allowed output power for a mobile station in a frequency band based on said parameter value and an offset value, the apparatus further configured to control the power of a transmission on said frequency band according to the lowest of (a) said maximum allowed output power, and (b) a value determined from one or more further parameters received at the mobile station, and a normalized received signal level at the mobile station.

2. The apparatus as claimed in claim 1, wherein said offset value is an offset value specific to said frequency band.

3. A mobile station comprising an apparatus as claimed in claim 1 and a transmitter configured to communicate with the telecommunications system based on General Packet Radio Service.

4. The apparatus according to claim 1, wherein said parameter value is indicative of a maximum allowed output power for said mobile station in another frequency band.

5. The apparatus according to claim 1, wherein a maximum allowed output power for another frequency band is also determinable from said parameter value and a different offset value for said another frequency band.

6. A method comprising:
receiving a parameter value,
determining a maximum allowed output power for a mobile station in a frequency band based on said parameter value and an offset value, and
controlling the power of a transmission on said frequency band according to the lowest of (a) said maximum allowed output power, and (b) a value determined from one or more further parameters received at the mobile station, and a normalized received signal level at the mobile station.

7. The method as claimed in claim 6, wherein said offset value is an offset value specific to said frequency band.

8. A computer readable medium comprising: a computer program product comprising program code configured to perform the method of claim 6 when the program is run on a computer.

9. The method according to claim 6, wherein said parameter value is indicative of a maximum allowed output power for said mobile station in another frequency band.

10. A method, comprising:
transmitting to a mobile station a parameter value, wherein a maximum allowed output power for the mobile station in at least one frequency band is determinable from said parameter value and an offset value, wherein the mobile station is configured to control the power of a transmission on said frequency band according to the lowest of (a) said maximum allowed output power, and (b) a value determined from one or more further parameters received at the mobile station, and a normalized received signal level at the mobile station.

11. A computer readable medium comprising: a computer program product comprising program code configured to perform the method of claim 10 when the program is run on a computer.

12. A system comprising:
at least one mobile station comprising: i) a first apparatus comprising a receiver configured to receive a parameter value; and a determiner configured to determine a maximum allowed output power for the at least one mobile station in a frequency band based on said parameter value and an offset value; and ii) a transmitter configured to communicate with the telecommunications system based on General Packet Radio Service; and
a second apparatus, comprising:
a transmitter configured to transmit to the at least one mobile station a parameter value;
wherein the maximum allowed output power for the at least one mobile station in at least one frequency band is determinable from said parameter value and an offset value;
wherein the first apparatus is configured to control the power of a transmission on said frequency band according to the lowest of (a) said maximum allowed output power, and (b) a value determined from one or more further parameters received at the at least one mobile station, and a normalized received signal level at the at least one mobile station.

13. An apparatus comprising:
a transmitter configured to transmit to a mobile station a parameter value; wherein a maximum allowed output power for the mobile station in at least one frequency band is determinable from said parameter value and an offset value, and the mobile station is configured to control the power of a transmission on said frequency band according to the lowest of (a) said maximum allowed output power, and (b) a value determined from one or more further parameters received at the mobile station, and a normalized received signal level at the mobile station.

* * * * *